March 27, 1934.  E. C. HORTON ET AL  1,952,864
WINDSHIELD HEATER
Filed March 11, 1929
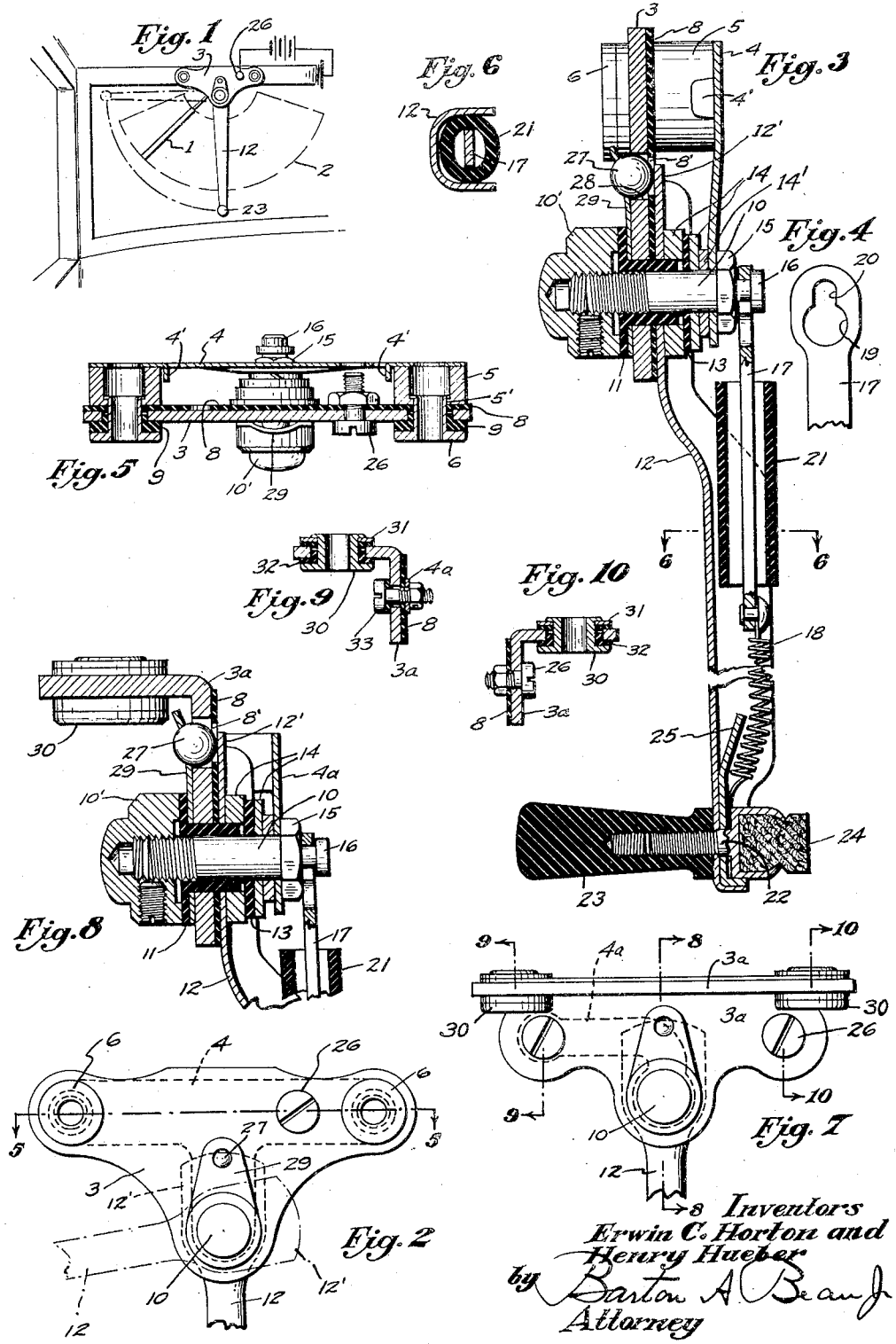
Inventors
Erwin C. Horton and
Henry Hueber
by Barton A. Bean Jr.
Attorney Patented Mar. 27, 1934

1,952,864

UNITED STATES PATENT OFFICE 1,952,864

WINDSHIELD HEATER

Erwin C. Horton, Hamburg, and Henry Hueber, Buffalo, N. Y., assignors to Trico Products Corporation, Buffalo, N. Y.

Application March 11, 1929, Serial No. 346,088

7 Claims. (Cl. 219—19)

This invention relates to a windshield heater for applying heat to the windshield glass to thereby thaw or loosen any congealed or icy coating thereon, such as is encountered during winter driving.

The invention primarily contemplates an electrical heater and the mounting of the same whereby it may be adjusted to an operative position for heating that portion of the windshield comprising the main field of vision, and when the heater has performed its function it may be parked or disposed in a position to one side of the field of vision, means being provided by which the energization of the heating element may be efficiently controlled.

Prior attempts have been made to devise an electric windshield heater of a practical nature, certain of which have the heating element mounted co-axially with an oscillating wiper for movement therewith, and others embodying a fixed heating element which is constantly arranged in or adjacent the field of vision, thereby tending to obstruct vision through the windshield glass. That type of heater which is mounted for movement coaxially with the wiping element of the windshield cleaner necessitates a construction in which the heater is moved back and forth across the glass in such a manner that the real beneficial effect of the heater is not fully appreciated since the heater is not in any one position for a sufficient length of time to warm that particular area of the glass, and by the time the heater element has returned to any particular area, such area has cooled off so that in reality the heat from the heater is not properly utilized unless excessive heat is applied, in which instance the items of expense and wear and tear on the battery are objectionable.

The objects of the present invention are to provide an electrically operated windshield heater which may be adjusted over the inner surface of the windshield glass to heat any particular area thereof regardless of the operation of the windshield cleaner on the exterior surface thereof; to provide an electrical windshield heater which is automatically energized upon movement of the heater from its parked position and which is automatically deenergized upon returning the heater to its parked position; and to provide an improved and simplified windshield heater the manufacture of which may be expeditiously and economically effected.

The invention is further found to reside in the novel features of construction and in the arrangements and combinations of parts hereinafter referred to, reference being had to the accompanying drawing wherein, Fig. 1 is an interior view of a motor vehicle windshield depicting one embodiment of the present invention mounted thereon in association with an exteriorly mounted windshield cleaner.

Fig. 2 is an enlarged front elevation of the pivoted end of the windshield heater.

Fig. 3 is a sectional view lengthwise through the heater arm.

Fig. 4 is a detailed view of a portion of the heating element retaining or supporting means.

Fig. 5 is a horizontal sectional view on the line 5—5 of Fig. 2.

Fig. 6 is a horizontal sectional view taken on line 6—6 of Fig. 3.

Fig. 7 is a view similar to Fig. 2 depicting a modified embodiment of the present invention.

Fig. 8 is a vertical sectional view taken on the line 8—8 of Fig. 7.

Fig. 9 is a vertical sectional view taken on the line 9—9 of Fig. 7.

Fig. 10 is a vertical sectional view taken on the line 10—10 of Fig. 7.

The present invention has been illustrated in association with a windshield cleaner of the oscillatory type wherein the blade 1 is adapted to travel over the exterior surface of the windshield for cleaning a zone 2 through which clear vision may be obtained.

The windshield heater is arranged at the inner side of the windshield glass for being manually moved to a position in proximity to said zone for heating the same, means being provided for automatically energizing and deenergizing the heater element when the heater is moved to and from an operative position.

The heater, in its preferred embodiment, includes a front supporting plate 3 and a rear grounding plate 4 spaced apart by a pair of spacing sleeves 5 which are secured to the plate 3 by flanged bushings 6, in turn, riveted over the internal shoulders 5' of said sleeves. The sleeves 5 and the bushings 6 are insulated from the plate 3 by a fibre sheet or plate 8 and a pair of fibre bushings 9. Ears 4' are struck from the plate 4 to lie adjacent the sleeves 5 as a means of assistance in locating the plate in the assembly.

A pivot member 10 is mounted in the lower central portion of the plates 3 and 4 and is insulated from the plate 3 by a flanged fibre bushing 11. A channel-shaped heater arm 12 is pivotal about the axis of member 10 and insulated therefrom, as by the bushing 11 and a fibre washer 13, suitable spacing washers 14 being provided, if necessary.

A resilient lock washer 14' is interposed between the plate 4 and the adjacent washer 14 to provide the necessary friction in the arm mounting whereby the arm will remain in a set position, operative or inoperative. The entire mounting assembly is maintained by a nut 10' threaded on the pivot member.

One end of the pivot member 10 is formed with a tool-applying part 15 and a projecting headed stud 16 over which latter is hung the supporting link 17 for the resistance element 18, said link being formed with a key-hole slot having its entrance opening 19, for passing over the head of the stud 16, and its reduced opening 20 extending toward the free end of the link and receiving the shank of the stud. By this arrangement the link is easily positionable and the stud shank is retained in the reduced opening 20 against unauthorized displacement. The supporting link 17 is held from electrical contact with the heater arm 12 by an insulating sleeve 21 which may be pressed between the sides of the channeled arm 12. The lower end of the heating coil 18 is grounded to the arm, being conveniently clamped between the head of screw 22 and the base of an operating handle 23. The head of the screw is provided with a cushion 24, of felt or the like, to rest upon the windshield glass and support the heater arm spaced therefrom.

A prop 25, preferably clamped between the heater arm 12 and the head of the screw 22, serves in conjunction with the sleeve 21 to space the heating coil 21 from the walls of the arm 12. By reason of the channeled formation of the arm the heat generated will be directed and reflected forwardly against the glass to warm the same very effectively.

The supporting plate 3 is electrically connected to the source of electrical energy, as by means of a binding post 26, means being provided for connecting the arm to the plate to complete the circuit. This means is automatic and, in the present form, comprises a contact with which the arm 12 electrically engages when moved to its operative position. The contact may be resilient, such as the ball 27 which is arranged in a pocket 28, in plate 3, and is retained and backed by a spring plate 29, the latter acting to project the ball detent through a relatively small aperture 8' in the insulating sheet 8 into the path of the adjacent end 12' of the arm. Consequently, the part 12' of the arm will ride over the ball and depress the same in making a good electrical connection. The spring plate 29 is conveniently secured in place by the nut 10', being insulated therefrom, and from the pivot member 10, by the bushing 11.

The embodiment disclosed in Figs. 1 through 6 is primarily designed for being mounted upon metal windshield frames so that the grounding plate 4 will rest upon and make contact with the metal frame, the heater being conveniently mounted by passing fastening screws or members through the bushings 6, sleeves 5 and the grounding plate 4 into the frame. When the arm is swung from the dotted, inoperative position, indicated in Fig. 1, to the full line position, the contact 12' of the arm is caused to move into engagement with the resilient switch contact 27 thereby closing the circuit from the battery to the binding post 26, through the ball 27, the switch contact 12', the arm 12, the resistance unit 18, the link 17, the grounding plate 4, and from the ground back to the battery.

Figs. 7 to 10, inclusive, illustrate a device similar in operation to the heater already described but adapted for use on windshields of the sliding type. In this modified structure the plate 3a is of angular form with a horizontal attaching flange through which a pair of flanged bushings 30 are secured, as by riveting their plain ends over washers 31. These parts are insulated from the plate as indicated at 32 in Figs. 9 and 10. Where it is not convenient to ground the device to the windshield frame the grounding plate 4a is provided with a binding post 33 which is rendered accessible by extending it through the plate 3a and insulating it therefrom.

The switch, the heater arm, and the mounting therefor are otherwise substantially identical with that already completely described in the alternative structure.

In attaching the embodiment disclosed in Figs. 7 through 10, the fastening screws are passed upwardly through the bushings 30 into the adjacent frame, and the opposite sides of the electric circuit are connected respectively to the binding posts 26 and 33, whereupon swinging the arm from its inoperative position to its operative position the circuit will be closed through the ball 27, the arm 12, the resistance element 18, the plate 4a, terminal post 33 and back to the source of electrical energy.

The arm 12 in each embodiment inclines toward the windshield and has its free end supported by the windshield glass under slight tension, the body of the arm being spaced from the glass by the supporting foot or pad 24. Thus the resistance element does not come into contact with the glass but being disposed within the channel of the arm its heat is confined and reflected forwardly to effectively heat the glass and loosen any congealed matter on the outside thereof.

While specific embodiments of the invention have been described in the foregoing specification it is understood that numerous changes may be made in the size, shape and general arrangement of parts without departing from the spirit or scope of the invention.

What is claimed is:

1. A windshield heater comprising a bracket having an aperture therein, a contact element disposed in the aperture, a heater arm carrying a resistance element, said arm being pivoted to the bracket and being movable relative thereto to operative and inoperative positions, a contact element carried by the arm in electrical connection with the resistance element, said last mentioned contact element being insulated from the first mentioned contact element when the arm is in inoperative position and contacting it when the arm is in operative position, and resilient means for urging the first mentioned contact element toward the other contact element.

2. In a windshield heater, an attaching plate having an arm-pivoting part insulated therefrom, a heater arm pivoted on said part and insulated therefrom, a resistance unit having an end carried by said arm in electrical contact therewith and having its opposite end detachably supported by said pivot part, and means for electrically connecting the arm to said plate, said plate and said part forming the open ends of an electric circuit.

3. A windshield cleaner comprising an attaching plate, a pivot member carried thereby and insulated therefrom, a heater arm pivoted on said pivot member and insulated therefrom and from said plate, a switch contact movable by the arm, a plate-carried contact disposed in the path of said arm-actuated contact for being engaged thereby to close a circuit, means for connecting the plate to one side of the circuit, means for connecting the pivot member to the opposite side of the circuit, said pivot member having a headed stud, a resistance unit supported by the arm in electrical contact therewith, and an attaching member for the resistance unit having a key-slot therein for detachably engaging over the headed stud.

4. A windshield cleaner comprising an attaching plate, a pivot member carried thereby, a channeled arm pivoted on said pivot member and having its channel opening toward the glass, a switch contact movable by the arm, a plate-carried contact disposed in the path of said arm-actuated contact for being engaged thereby to close a circuit, means for connecting the plate to one side of the circuit, a resistance unit attached electrically to the free end of the arm and disposed in the channel thereof, a supporting member for the opposite end of the resistance unit, means for connecting the supporting member to the opposite side of the circuit, said supporting member and said resistance unit being disposed within the channel of the arm, and a sustaining spacer insulating the supporting member from said arm and serving to space the unit from the walls of the arm channel.

5. A windshield cleaner comprising an attaching plate, a pivot member carried thereby and insulated therefrom, a heater arm pivoted on said pivot member and insulated therefrom and from said plate, a switch contact movable by the arm, a plate-carried contact disposed in the path of said arm-carried contact for being engaged thereby to close a circuit, means for connecting the plate to one side of the circuit, means for connecting the pivot member to the opposite side of the circuit, said arm being channeled and opening toward the windshield glass, a resistance unit attached to the free end of the arm, a supporting link for the opposite end of the resistance unit, means connecting the link to said pivot member, said link and said resistance unit being disposed within the channel of the arm, and an insulating sleeve about the link adapted to be pressed frictionally into the channel of the arm for supporting the same and positioning the link and unit spaced from the walls of the arm channel.

6. In a windshield heater, a supporting pivot member including a headed stud, an arm pivoted to said member and insulated therefrom, an electrical resistance element extending along the arm, means connecting one end of the resistance element to the free end of the arm, an attaching member connected to the other end of the resistance element, said attaching member having a key slot therein detachably engaged over the headed stud.

7. In a windshield heater adapted to be mounted upon a metallic portion of a vehicle adjacent the windshield, comprising a bracket insulated from said metallic portion, a pintle adjacent to the bracket and insulated therefrom, said pintle being in electrical contact with said metallic portion, an arm pivoted to the pintle and insulated therefrom, a resistance element extending along the arm and connected to the free end of the arm and to the pintle, and means automatically operable upon predetermined movement of the arm relative to the pintle and bracket for placing said arm and bracket in electrical contact, whereby said resistance element will be placed in electrical circuit with the supporting bracket and said metallic portion of the vehicle.

ERWIN C. HORTON.
HENRY HUEBER.